United States Patent
Sakai et al.

(10) Patent No.: US 6,532,587 B1
(45) Date of Patent: Mar. 11, 2003

(54) ELECTRONIC EQUIPMENT

(75) Inventors: Ryuichi Sakai, Osaka (JP); Koji Hirose, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/260,422

(22) Filed: Mar. 1, 1999

(30) Foreign Application Priority Data

Feb. 27, 1998 (JP) .......................................... 10-046945

(51) Int. Cl.⁷ .............................. G06F 9/44; G06F 9/445
(52) U.S. Cl. .......................... 717/168; 717/174; 713/2; 711/102; 711/103
(58) Field of Search .......................... 717/11, 168, 174; 711/100, 102, 103; 713/2

(56) References Cited

U.S. PATENT DOCUMENTS

| | | | | |
|---|---|---|---|---|
| 4,580,212 A | * | 4/1986 | Hosaka ........................ 711/115 |
| 4,607,332 A | * | 8/1986 | Goldberg ........................ 714/8 |
| 4,691,318 A | * | 9/1987 | Entenman ..................... 714/793 |
| 4,897,813 A | * | 1/1990 | Kumbasar ..................... 365/49 |
| 5,175,828 A | * | 12/1992 | Hall et al. .................... 709/331 |
| 5,325,532 A | * | 6/1994 | Crosswy et al. ................ 713/2 |
| 5,349,697 A | * | 9/1994 | Pelkonen ..................... 455/572 |
| 5,473,775 A | * | 12/1995 | Sakai et al. ..................... 713/2 |
| 5,546,586 A | * | 8/1996 | Wetmore et al. ............. 717/122 |
| 5,550,997 A | * | 8/1996 | Ip et al. ...................... 711/103 |
| 5,574,926 A | * | 11/1996 | Miyazawa et al. ............ 712/38 |
| 5,623,604 A | * | 4/1997 | Russell et al. ............... 717/167 |
| 5,768,563 A | * | 6/1998 | Porter et al. .................. 703/27 |
| 5,790,860 A | * | 8/1998 | Wetmore et al. ............. 717/122 |
| 5,794,054 A | * | 8/1998 | Le et al. ..................... 710/240 |
| 5,802,549 A | * | 9/1998 | Goyal et al. ................. 711/102 |
| 5,805,882 A | * | 9/1998 | Cooper et al. .................. 713/2 |
| 5,815,722 A | * | 9/1998 | Kalwitz et al. .............. 717/178 |
| 5,819,087 A | * | 10/1998 | Le et al. ........................ 713/2 |
| 5,835,761 A | * | 11/1998 | Ishii et al. .................... 713/100 |
| 5,878,256 A | * | 3/1999 | Bealkowski et al. ........... 713/2 |
| 5,905,921 A | * | 5/1999 | Miyazawa .................... 396/300 |
| 5,964,873 A | * | 10/1999 | Choi ............................ 713/2 |
| 6,085,268 A | * | 7/2000 | Lee et al. ..................... 710/72 |
| 6,185,678 B1 | * | 2/2001 | Arbaugh et al. ............... 713/2 |
| 6,266,810 B1 | * | 7/2001 | Tanaka et al. ............... 717/173 |
| 6,338,435 B1 | * | 1/2002 | Carper ........................ 235/487 |

FOREIGN PATENT DOCUMENTS

| | | | |
|---|---|---|---|
| EP | 0 458 559 A2 | 11/1991 | |
| JP | 62-147555 | 7/1987 | ........... G06F/13/00 |
| JP | 02 041523 | 2/1990 | ............. G06F/9/06 |
| JP | 03 269725 | 12/1991 | ............. G06F/9/06 |
| JP | 05 119997 | 5/1993 | ............. G06F/9/06 |

OTHER PUBLICATIONS

Jex, J.; "Flash memory BIOS for PC and notebook computers". IEEE Pacific Rim Conference on Communications, Computers and Signal Processing, May 1991, vol. 2, pp. 692–695.*

European Search Report, Application No. 99103466 dated Oct. 10, 2000.

"Circuits To Allow Cartridge Hot–Plugging", IBM Technical Disclosure Bulletin, vol. 29, No. 7, 12/86.

* cited by examiner

Primary Examiner—John A. Follansbee
Assistant Examiner—Kelvin E Booker
(74) Attorney, Agent, or Firm—RatnerPrestia

(57) ABSTRACT

A data transfer unit is connected with an external nonvolatile memory storing a correction program and the like data, and it transfers the correction program, etc. of the external nonvolatile memory to an internal nonvolatile memory upon detecting it having been connected with the external nonvolatile memory. The external nonvolatile memory is disconnected from the data transfer unit after completion of the data transfer. When a CPU unit is reset thereafter, it transfers the correction program, etc. to a RAM unit, executes a program in a ROM unit, and also executes the correction program in the RAM unit upon reaching a correcting point stored in the RAM unit.

4 Claims, 5 Drawing Sheets

ELECTRONIC EQUIPMENT

FIELD OF THE INVENTION

The present invention relates to electronic equipment provided with a microprocessor, such as a video tape recorder and the like apparatuses.

BACKGROUND OF THE INVENTION

In the past, most of electronic equipment have been such that various kinds of control are executed according to a program written in a microprocessor and a read-only memory unit.

FIG. 5 shows an example of the electronic equipment of the prior art.

A read-only memory unit 51 (hereinafter simply referred to as ROM 51) stores a program for operating a central processing unit 53 (hereinafter simply referred to as CPU 53). A random-access memory unit 52 (hereinafter simply referred to as RAM 52) is stored with a ROM correction data (hereinafter referred to as RCD) consisting of the following:

(1) a program for correcting the program stored in the ROM 51;
(2) a point of correction, which is a locative information of a point for initiating an execution of the correction program; and
(3) a version number of the correction program.

The CPU 53 executes the correction program stored in the RAM 52 when it reaches the point of correction (hereinafter simply referred to as correcting point), which is the locative information of a point for initiating an execution of the correction program in the RAM 52, while also executing the program stored in the ROM 51. An internal nonvolatile memory 54 (hereinafter simply referred to as memory 54) stores the RCD, and transfers the RCD to the RAM 52 according to a command of the CPU 53.

The electronic equipment of the prior art constructed as foregoing operates in a manner which will be described hereinafter.

Initially, the RCD is not stored in the memory 54. If the RCD is stored in the memory 54 under the above circumstance, the ROM 51 shall have a program in advance for proceeding with transferring the data to the RAM 52 in time with a resetting of the CPU 53. Since the RCD is not stored in the memory 54 in the case of the present example, no RCD is present for being transferred to the RAM 52. Therefore, the CPU 53 operates only in accordance with the program stored in the ROM 51.

In case if any problem is found in the program stored in the ROM 51 after the electronic equipment is completed, the memory 54 is replaced with another nonvolatile memory stored with an RCD for correcting the problem. Hence, the CPU53 transfers the RCD stored in the replaced memory 54 to the RAM 52 in time with a resetting of the CPU 53. Therefore the CPU 53 executes the program in the ROM 51. The CPU 53 also executes the correction program in the RAM 52, when it reaches a correcting point stored in the RAM 52. In this way, the problem in the program stored in the ROM 51 can be corrected.

Generally, the ROM 51 has a larger memory, and takes a longer lead-time as compared to the memory 54. Therefore, it is more expedient both in cost and time to replace the memory 54 than the ROM 51. Also, the removed memory 54 can be reused again, since it is rewritable (thereby reducing the cost).

In the foregoing electronic equipment of the prior art, however, it is necessary that the equipment be disassembled for replacement of a component in order to correct the program stored in the ROM 51. It has been a problem of costing much labor for the above reason.

SUMMARY OF THE INVENTION

The present invention is intended to avert the above problems, and it aims at providing electronic equipment that can readily make correction of a program stored in a ROM unit without disassembling the equipment.

In order to achieve this object, electronic equipment of the present invention comprises:

(1) a ROM unit stored with a program for operating a CPU unit;
(2) a RAM unit for storing an RCD, which is composed of a program for correcting the program in the ROM unit, a correcting point, and a version number of the correction program;
(3) a CPU unit for executing the correction program in the RAM unit when it reaches the correcting point stored in the RAM unit, while executing the program of the ROM unit at the same time;
(4) an internal nonvolatile memory for storing the RCD, and transferring the RCD to the RAM unit according to a command of the CPU unit; and
(5) a data transfer unit capable of connecting between an external nonvolatile memory storing the RCD and the internal nonvolatile memory via a connector without requiring disassembly of the electronic equipment.

If any problem is found in the program stored in the ROM unit after the electronic equipment is completed, an RCD for correcting the problem is prepared, and the RCD is stored in the external nonvolatile memory separate from the electronic equipment. The external nonvolatile memory is then connected to the connector equipped in the electronic equipment. The data transfer unit connected with the connector transfers the RCD stored in the external nonvolatile memory to the internal nonvolatile memory, either automatically by detecting the connection with the external nonvolatile memory storing the RCD outside of it, or at a command of the CPU unit. In this way, the electronic equipment of the present invention composed as above can readily update the RCD in the internal nonvolatile memory without disassembling the equipment. The CPU unit is subsequently reset by unplugging and plugging the AC supply plug, or by turning off and on the power supply to the electronic equipment. The CPU unit transfers the RCD stored in the internal nonvolatile memory to the RAM unit by this resetting operation. The CPU unit executes the program in the ROM unit as well as the correction program in the RAM unit, as it reaches the correcting point stored in the RAM unit. The problem of the program stored in the ROM unit can be corrected in this manner.

Accordingly, the electronic equipment of the present invention is able to make a correction of the program stored in the ROM unit easily without disassembling the equipment, as has been required with the prior art equipment.

DESCRIPTION OF THE PREFERRED EMBODIMENTS

Exemplary embodiments of the present invention will now be described by referring to the accompanied figures.

(First Exemplary Embodiment)

Figure 1:
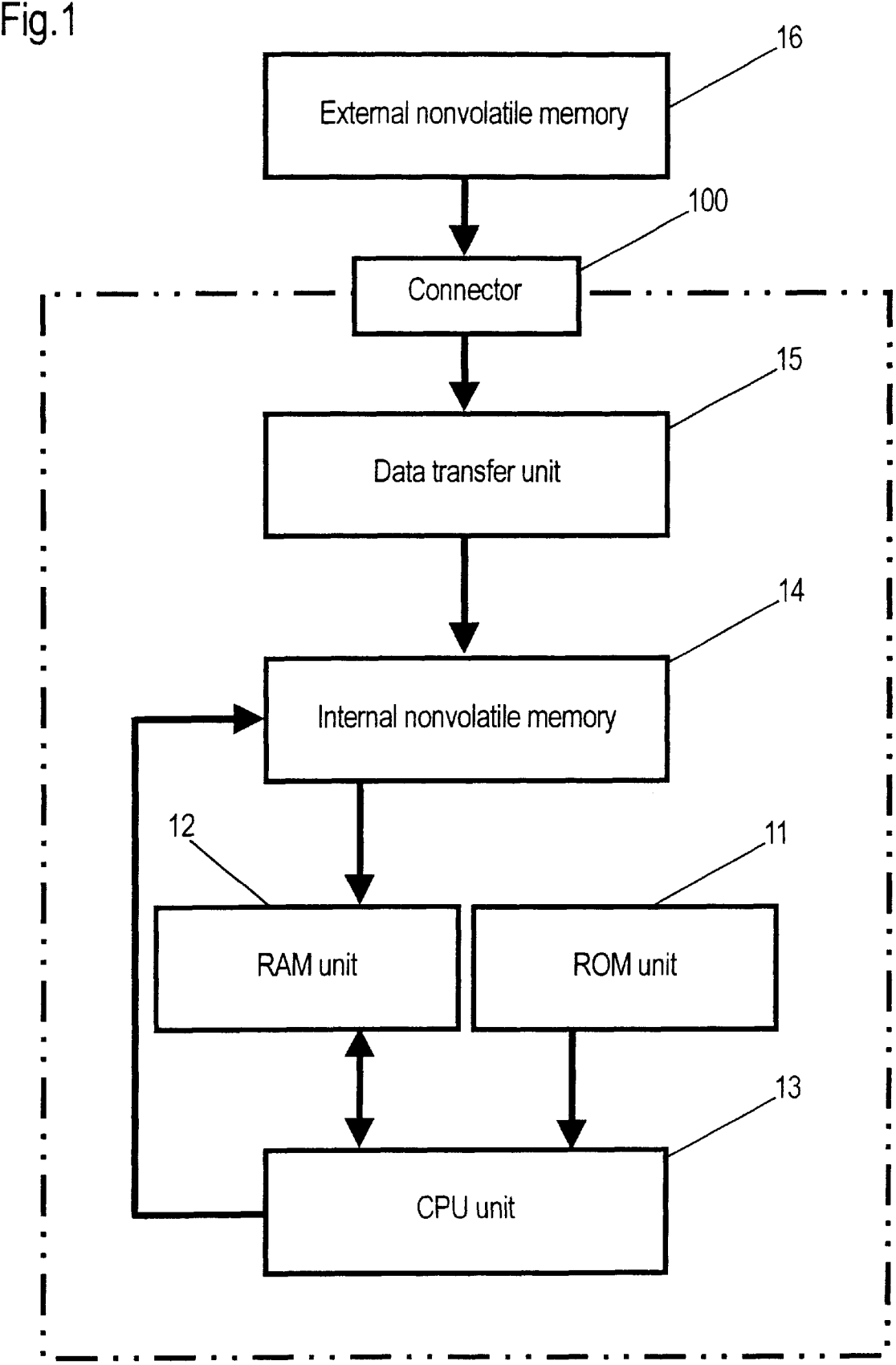
FIG. 1 is a block diagram depicting a structure of electronic equipment of a first exemplary embodiment of the present invention.

FIG. 1 is a block diagram depicting a structure of electronic equipment of a first exemplary embodiment of the present invention.

A ROM unit 11 (hereinafter simply referred to as ROM 11) stores a program for operating a CPU unit 13 (hereinafter simply referred to as CPU 13). A RAM unit 12 (hereinafter simply referred to as RAM 12) is stored with an RCD composed of a program for correcting the program in the ROM 11, a correcting point, and a version number of the correction program. The CPU 13 executes the correction program in the RAM 12 when it reaches a correcting point stored in the RAM 12, while executing the program of the ROM 11 at the same time. An internal nonvolatile memory 14 (hereinafter simply referred to as memory 14) stores the RCD, and transfers the RCD to the RAM 12 at a command of the CPU 13. When an external nonvolatile memory 16 (hereinafter simply referred to as memory 16) storing an RCD is connected to a connector 100, a transfer unit 15, which is also connected with the connector 100, transfers the RCD to the memory 14 by detecting the connection. The transfer unit 15 transfers the data only if the RCD is stored in the memory 16.

The electronic equipment of the first exemplary embodiment constructed as above operates in a manner, which is described hereinafter.

An assumption is made that an RCD has not been stored initially in the memory 14. It is also assumed that the program in the ROM 11 originally includes a process for transferring an RCD to the RAM 12 in time with a resetting of the CPU 13, only if the RCD has been stored in the memory 14. Since the RCD is not stored in the memory 14 in this case, no RCD exists for being transferred to the RAM 12. Thus, the CPU 13 operates only in accordance with the program stored in the ROM 11.

In case that any problem is found in the program stored in the ROM 11 after the electronic equipment is completed, an RCD for correcting the problem is prepared, and the RCD is stored in the memory 16 external of the electronic equipment. The memory 16 storing the RCD is then connected to the connector 100 of the electronic equipment. The transfer unit 15 connected with the connector 100 in the electronic equipment detects the connection of the memory 16, verifies whether or not the RCD is stored in the memory 16, and transfers the data in the memory 16 to the memory 14, when storage of the RCD is verified. The memory 16 is then disconnected upon completion of transferring the data from the memory 16 to the memory 14.

A method adopted by the transfer unit 15 for detecting the connection of the memory 16 is now described. The transfer unit 15 is connected to the memory 16 and the memory 14 with an internal IC bus bar (hereinafter simply referred to as IIC bus). The transfer unit 15 serves as a master, and the memory 16 and the memory 14 function as slaves, so as to communicate with one another. As one of the characteristics of the IIC bus communication, each device is assigned with a slave address in order to distinguish the individuals in a plurality of the devices connected to a single bus bar. The memory 16 and the memory 14 are also assigned with slave addresses individually. The transfer unit 15 is able to communicate with the memory 16 and the memory 14 individually by designating the slave address for each of the devices.

As another characteristic of the IIC bus communication, when the master transmits a slave address, a device that is assigned with that slave address returns an acknowledgement. The data are exchanged in this manner while confirming a certainty of the normal communication. Incidentally, the foregoing operation conforms to an existing standard for the IIC bus communication.

Based on the foregoing, an operation of the transfer unit 15 for detecting the connection with the memory 16 is described hereinafter. The transfer unit 15 attempts to read the memory 16 at regular intervals. (since the transfer unit 15 sends a command for the reading operation along with the designated slave address of the memory 16 during these attempts, it never reads the memory 14 accidentally.) Nonetheless, no acknowledgement is returned to it from the memory 16, if the memory 16 is not connected. It is therefore known that the memory 16 is not connected. If the memory 16 is connected, an acknowledgement is returned immediately after the transfer unit 15 sends the slave address. Accordingly, the connection of the memory 16 is verified, and the data can be read subsequently thereafter. As has been described, detection of an acknowledgement returned form the slave device in the IIC bus can determine whether or not the memory 16 is connected.

The CPU 13 is then reset by unplugging and plugging the AC supply plug, or by turning off and on the power supply to the electronic equipment. The CPU 13 transfers the RCD stored in the memory 14 to the RAM 12 by this resetting operation. Following the above, the CPU 13 executes the program in the ROM 11 and the correction program in the RAM 12, when it comes to the correcting point stored in the RAM 12. The problem of the program stored in the ROM 11 can be corrected in this manner.

Thus, what has been described in the first exemplary embodiment is the electronic equipment that is able to easily make a correction of the problem in the program stored in the ROM without disassembling the equipment, by simply connecting the detachable memory 16 storing an external RCD from the outside.

In addition, the present method of correction is remarkably superior in respect of lead-time and maintainability, since it requires an extremely easy operation comprising:

a first step of connecting an external memory stored with an RCD prepared in advance to the electronic equipment, and transferring the RCD to an internal memory;

a second step of disconnecting the external memory from the electronic equipment; and a third step of unplugging and plugging the AC supply plug.

As has been described, the invention in the first exemplary embodiment provides with a noble effect of realizing superior electronic equipment with respect to the cost and maintenance. Although electronic equipment of the prior art has required one external memory storing an RCD for each of the electronic equipment to be corrected, the first exemplary embodiment of the present invention enables one external memory storing an RCD to correct a number of the electronic equipment.

Although what has been described is an exemplar in that both the memory 16 and the memory 14 store a single RCD, they can function in the same manner even if they store a plurality of RCDs.

(Second Exemplary Embodiment)

Figure 2:
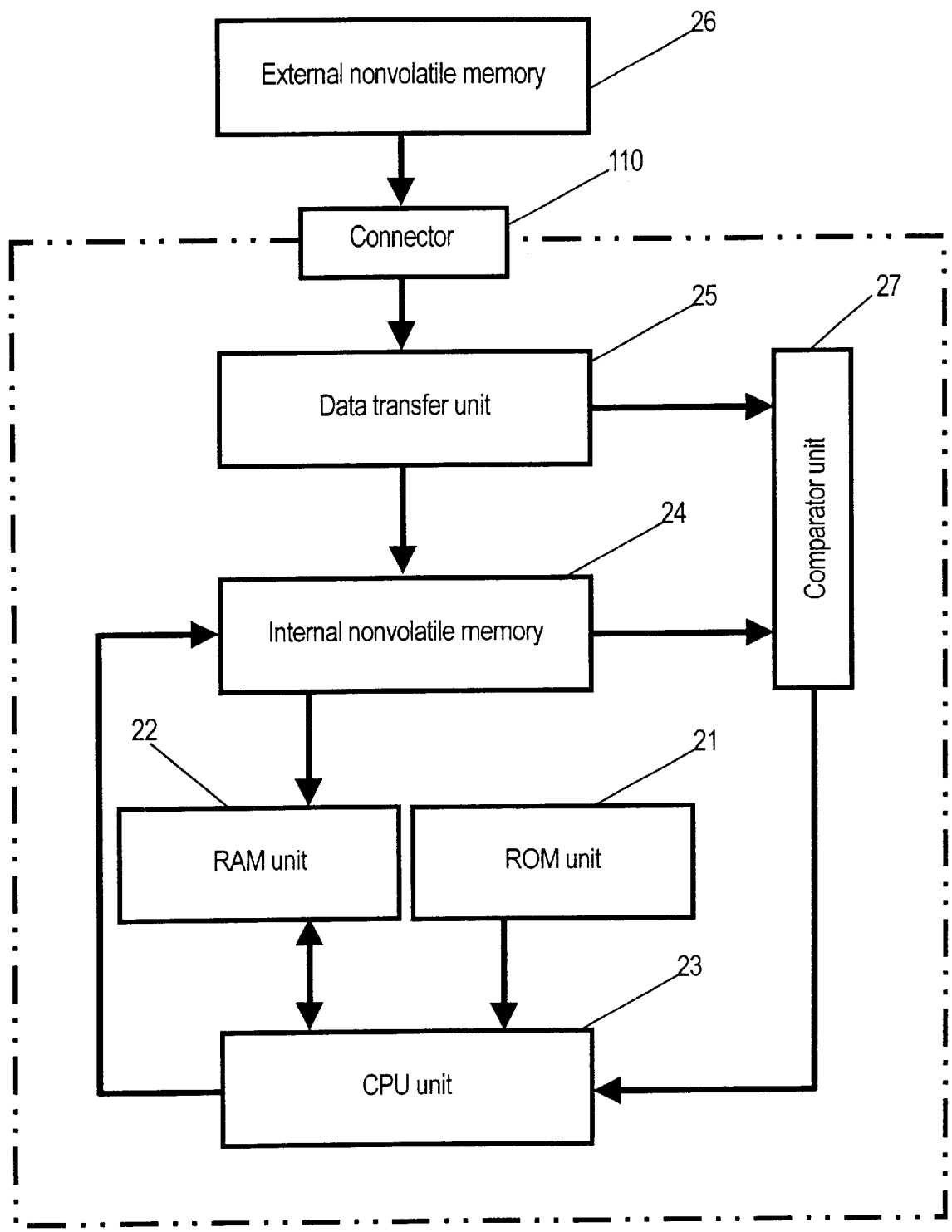
FIG. 2 is a block diagram depicting a structure of electronic equipment of a second exemplary embodiment of the present invention.

FIG. 2 is a block diagram depicting a structure of electronic equipment of a second exemplary embodiment of the present invention.

A ROM unit 21 (hereinafter simply referred to as ROM 21) stores a program for operating a CPU unit 23 (hereinafter simply referred to as CPU 23). A RAM unit 22 (hereinafter simply referred to as RAM 22) is stored with an RCD composed of a program for correcting the program in the ROM 21, a correcting point, and a version number of the correction program. The CPU 23 executes the correction program in the RAM 22 when it comes to a correction point stored in the RAM 22, while executing the program of the ROM 21 at the same time. An internal nonvolatile memory 24 (hereinafter simply referred to as memory 24) stores the RCD, and transfers the RCD to the RAM 22 at a command of the CPU 23. When an external nonvolatile memory 26 (hereinafter simply referred to as memory 26) storing an RCD is connected to a connector 110, a transfer unit 25, which is also connected with the connector 110, detects the connection, passes an information of the connection to the CPU 23, and transfers the data to the memory 24 at a command of the CPU 23. The transfer unit 25 transfers the data only if the RCD is stored in the memory 26. A comparator unit 27 compares a version number of the correction program stored in the memory 26 and read through the transfer unit 25 with a version number of the correction program read from the memory 24, and delivers a result to the CPU 23.

The electronic equipment of the second exemplary embodiment constructed as above operates in a manner, which is described hereinafter.

An assumption is made that corrections of the ROM 21 of this electronic equipment have previously been made several times in the manner as described in the first exemplary embodiment, and the RCD has already been stored in the memory 24. It is also assumed that the program in the ROM 21 originally includes a process for transferring the RCD to the RAM 22 in time with a resetting of the CPU 23, if the RCD has been stored in the memory 24, in the same way as the first exemplary embodiment.

Let it be supposed that a new problem is found in the program stored in the ROM 21 of the electronic equipment.

In the same way as the first exemplary embodiment, an RCD for correcting the problem is prepared, and the RCD is stored in the memory 26 external of the electronic equipment. The memory 26 storing the RCD is then connected to the connector 110 of the electronic equipment. The transfer unit 25 connected with the connector 110 detects the connection of the memory 26, and send the fact to the CPU 23. Also, the transfer unit 25 reads a version of the correction program stored in the memory 26, and delivers it to the comparator unit 27. The comparator unit 27 compares the version of the correction program of the memory 26 received from the transfer unit 25 with a version of the correction program stored at that point of time in the memory 24, and delivers a result to the CPU 23. If the version of the correction program in the memory 24 is later than that of the memory 26, the CPU 23 orders the transfer unit 25 not to transfer the RCD in the memory 26 to the memory 24. On the contrary, the CPU 23 orders the transfer unit 25 to transfer the RCD in the memory 26 to the memory 24, if the version of the correction program in the memory 26 is later than that of the memory 24. The transfer unit 25 transfers the RCD in the memory 26 to the memory 24 pursuant to the order. Connection of the memory 26 to the electronic equipment is then disconnected upon completion of transferring the RCD to the memory 24. Subsequently, the problem of the program stored in the ROM 21 is corrected by executing an operation similar to the first exemplary embodiment.

As has been described, the second exemplary embodiment provides with a favorable effect enabling a renewal of the ROM 21 with the latest correction program by preventing it from being overwritten with an older correction program due to a human error in the case of making corrections of the ROM 21 many times, in addition to the same effect as the first exemplary embodiment enabling an easy corrections of the ROM 21.

(Third Exemplary Embodiment)

Figure 3:
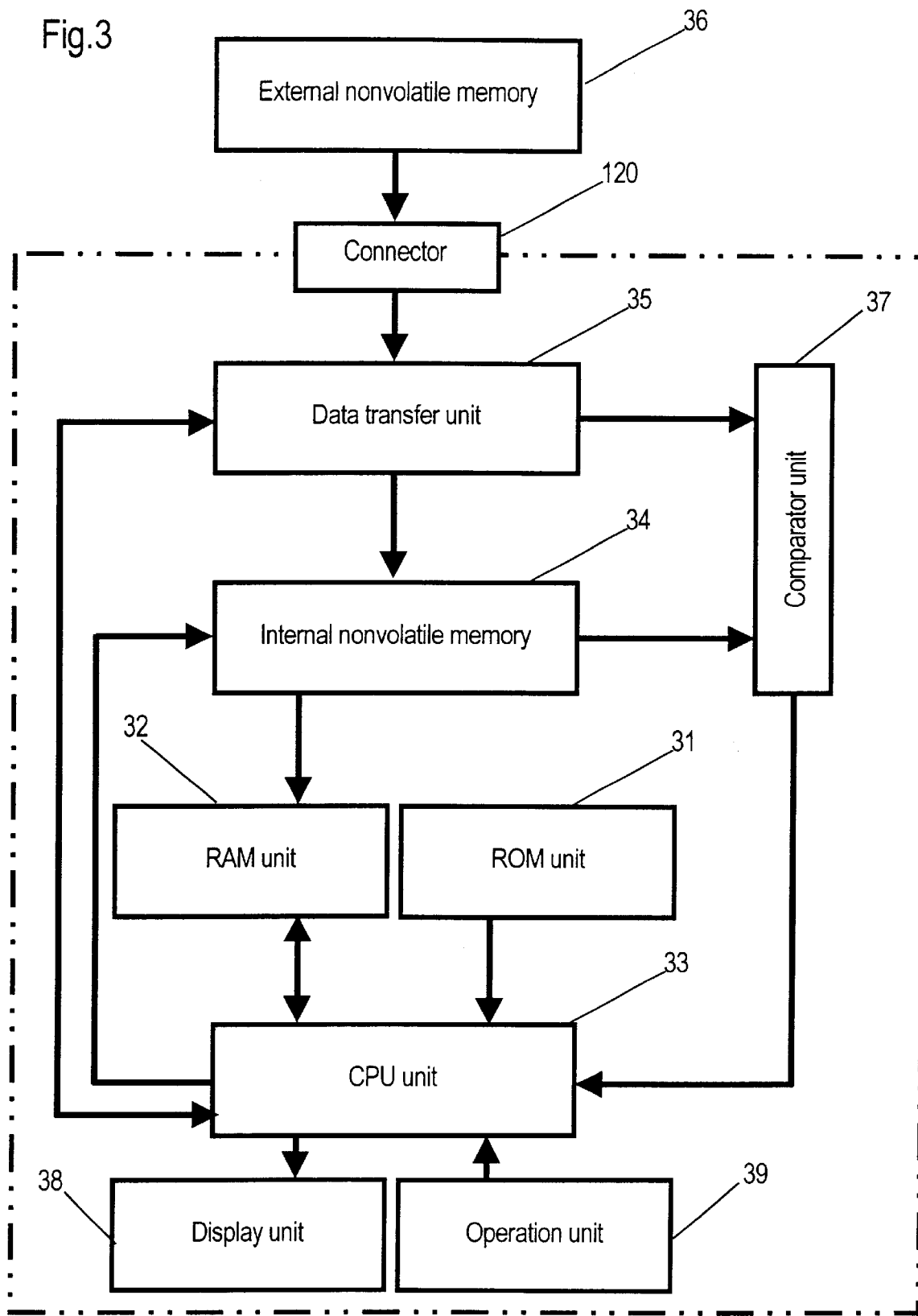
FIG. 3 is a block diagram depicting a structure of electronic equipment of a third exemplary embodiment of the present invention.

FIG. 3 is a block diagram depicting a structure of electronic equipment of a third exemplary embodiment of the present invention.

A ROM unit 31 (hereinafter simply referred to as ROM 31) stores a program for operating a CPU unit 33 (hereinafter simply referred to as CPU 33). A RAM unit 32 (hereinafter simply referred to as RAM 32) is stored with an RCD composed of a program for correcting the program in the ROM 31, a correcting point, and a version number of the correction program. The CPU 33 executes the correction program in the RAM 32 when it comes to a correction point stored in the RAM 32, while executing the program of the ROM 31 at the same time. An internal nonvolatile memory 34 (hereinafter simply referred to as memory 34) stores the RCD, and transfers the RCD to the RAM 32 at a command of the CPU 33. When an external nonvolatile memory 36 (hereinafter simply referred to as memory 36) storing an RCD is connected to a connector 120, a transfer unit 35, which is also connected with the connector 120, detects the connection, passes an information of the connection to the CPU 33, and transfers the data to the memory 34 at a command of the CPU 33. A comparator unit 37 compares a version number of the correction program stored in the memory 36 and read through the transfer unit 35 with a version number of the correction program read from the memory 34, and delivers a result as well as the version number of each of the correction programs to the CPU 33. A display unit 38 shows the version number of the correction program stored in the memory 36 and the version number of the correction program stored in the memory 34 according to a command of the CPU 33. An operation unit 39 orders the CPU 33 to transfer the RCD stored in the memory 36 to the memory 34.

The electronic equipment of the third exemplary embodiment constructed as above operates in a manner, which is described hereinafter.

An assumption is made in the same manner as the second exemplary embodiment, that the memory 34 has already stored an RCD, and that the program in the ROM 31 includes a process for transferring the RCD in the memory 34 to the RAM 32 when the CPU 33 is reset.

Let it be supposed again that a new problem is found in the program stored in the ROM 31 of the electronic equipment, in the above case.

In the same way as the second exemplary embodiment, an RCD for correcting the problem is prepared, and the RCD is stored in the memory 36 external of the electronic equipment. The memory 36 storing the RCD is then connected to the connector 120 of the electronic equipment. The transfer unit 35 connected to the connector 120 detects the connection of the memory 36, and send the fact to the CPU 33. Also, the transfer unit 35 reads and delivers a version of the correction program stored in the memory 36 to the comparator unit 37. The comparator unit 37 compares the version of the correction program of the memory 36 received from the transfer unit 35 with a version of the correction program stored in the memory 34 at that point of time, and delivers a result as well as the version number of each of the correction programs to the CPU 33. The CPU 33 orders the display unit 38 to show the version number of the correction program stored in the memory 34 and the version number of the correction program stored in the memory 36. The display unit 38 shows them according to the command of the CPU 33. By referring to the display, a user verified the version of the existing correction program, and inputs a command for the CPU 33 to update version of the correction program by manipulating the operation unit 39, if he determines it necessary. The CPU 33 may accept the command received from the operation unit 39 only if the version of the correction program in the memory 36 is later than that of the memory 34, as a matter of course, and orders the transfer unit 35 to transfer the RCD in the memory 36 to the memory 34. Thus, the transfer unit 35 transfers the RCD in the memory 36 to the memory 34 pursuant to the order. Connection of the memory 36 to the electronic equipment is then disconnected when the RCD is transferred to the memory 34. Subsequently, the problem of the program stored in the ROM 31 is corrected by executing an operation similar to the second exemplary embodiment.

As has been described, the third exemplary embodiment is able to prevent an overwriting with an older correction program by error in the same manner as the second exemplary embodiment. Moreover, the user can determine whether or not to update the version (instead of making the determination and execution automatically), as he can confirm the version of the correction program stored at the point in time. Accordingly, it gives an advantage of avoiding an unnecessary renewal of version, in the case of a limited application such as an area where renewal is not necessary.

(Fourth Exemplary Embodiment)

Figure 4:
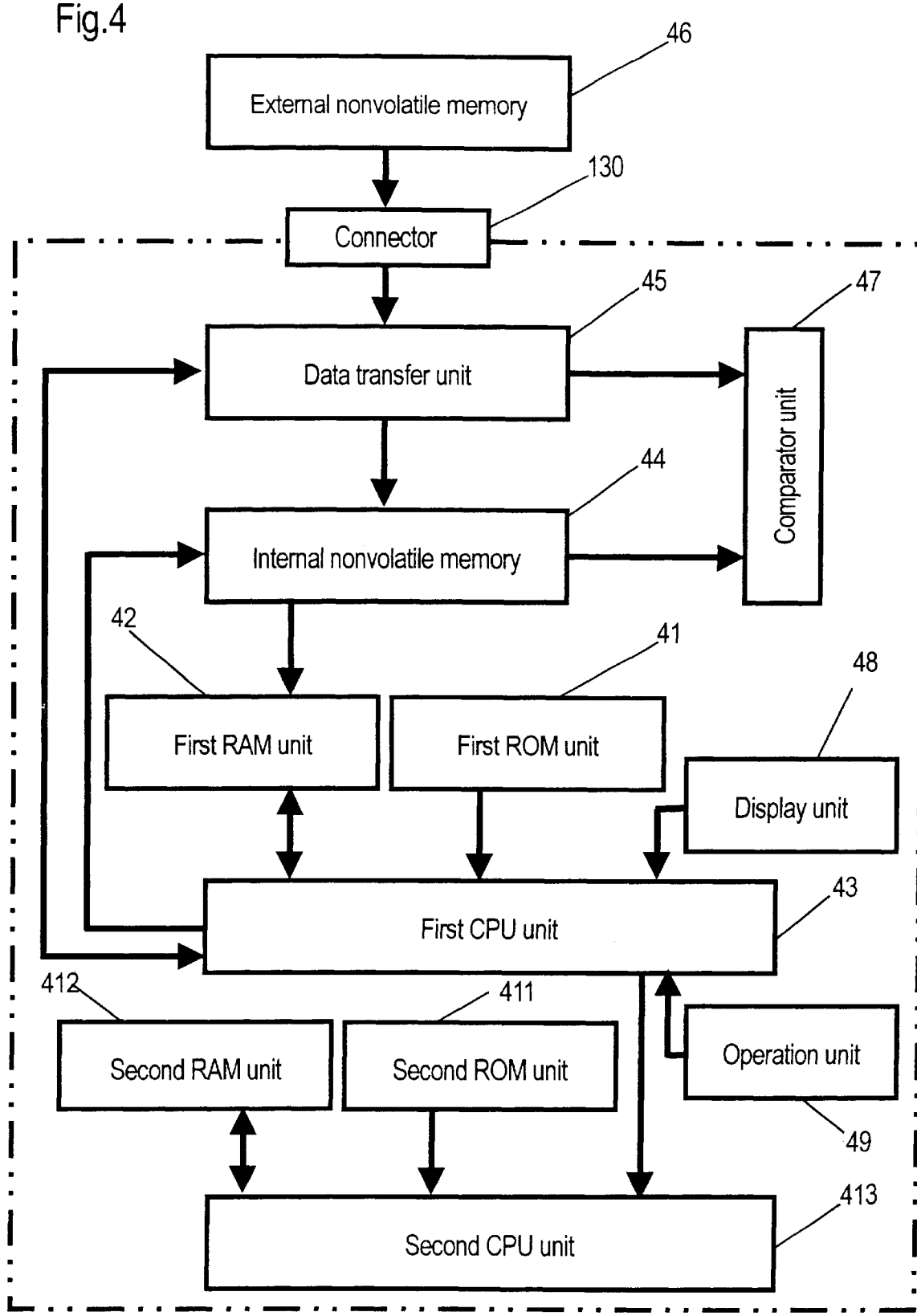
FIG. 4 is a block diagram depicting a structure of electronic equipment of a fourth exemplary embodiment of the present invention.
Figure 5:
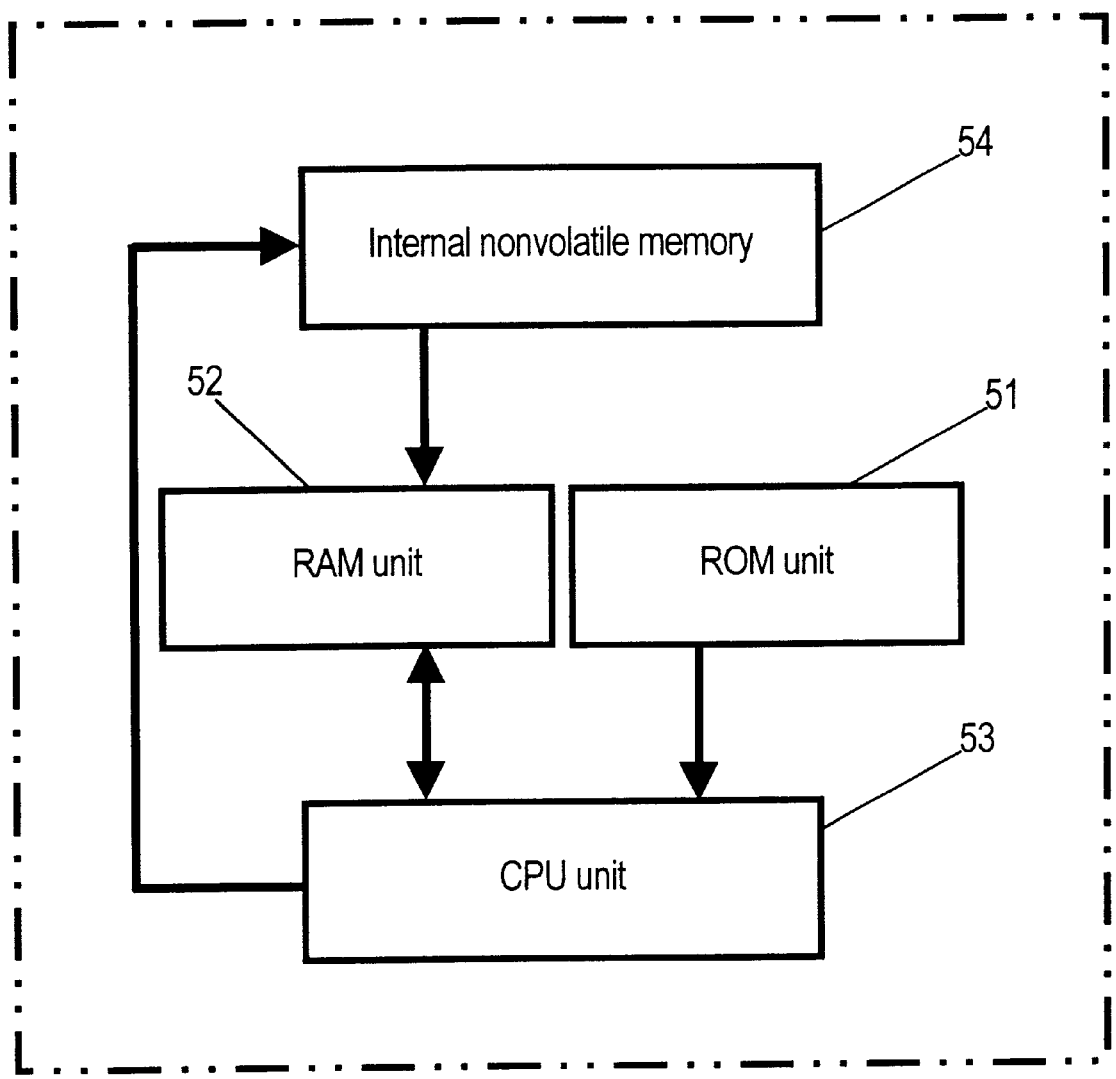
FIG. 5 is a block diagram depicting a structure of electronic equipment of the prior art.

FIG. 4 is a block diagram depicting a structure of electronic equipment of a fourth exemplary embodiment of the present invention.

A first ROM unit 41 (hereinafter simply referred to as 1st ROM 41) stores a program for operating a first CPU unit 43 (hereinafter simply referred to as 1st CPU 43). A first RAM unit 42 (hereinafter simply referred to as 1st RAM 42) is stored with an RCD composed of a program for correcting the program in the 1st ROM 41, a correcting point, and a version number of the correction program. The 1st CPU 43 executes the correction program in the 1st RAM 42 when it comes to a correcting point stored in the 1st RAM 42, while executing the program of the 1st ROM 41 at the same time. A second ROM unit 411 (hereinafter simply referred to as 2nd ROM 411) stores a program for operating a second CPU unit 413 (hereinafter simply referred to as 2nd CPU 413). A second RAM unit 412 (hereinafter simply referred to as 2nd RAM 412) is stored with an RCD composed of a program for correcting the program in the 2nd ROM 411, a correcting point, and a version number of the correction program. The 2nd CPU 413 executes the correction program in the 2nd RAM 412 when it comes to a correcting point stored in the 2nd RAM 412 while executing the program of the 2nd ROM 411 at the same time, and also stores the RCD delivered from the 1st CPU 43 into the 2nd RAM 412. An internal nonvolatile memory 44 (hereinafter simply referred to as memory 44) stores the RCDs corresponding to the program stored in the 1st ROM 41 as well as the program stored in the 2nd ROM 411. Further, the memory 44 transfers the RCD corresponding to the program stored in the 1st ROM 41 to the 1st RAM 42, and the other RCD corresponding to the program stored in the 2nd ROM 411 to the 2nd CPU 413 via the 1st CPU 43 at a command of the 1st CPU 43. When an external nonvolatile memory 46 (hereinafter simply referred to as memory 46) storing RCDs is connected to a connector 130 of the electronic equipment, a transfer unit 45 detects the connection, passes an information of the connection to the 1st CPU 43, and transfers the RCDs to the memory 44 at a command of the 1st CPU 43. A comparator unit 47 compares a version number for each of the correction programs stored in the memory 46 and read through the transfer unit 45 with a version number for each of the correction programs read from the memory 44, and delivers a result as well as the version of each of the correction programs to the 1st CPU 43. A display unit 48 shows the version number of each of the correction programs stored in the memory 46 and the version number of each of the correction programs stored in the memory 44 at a command of the 1st CPU 43. An operation unit 49 orders the 1st CPU 43 to transfer the individual RCDs stored in the memory 46 to the memory 44.

The electronic equipment having a foregoing structure as depicted in FIG. 4 operates in a manner, which is described hereinafter.

In the same manner as the third exemplary embodiment, an assumption is made that the memory 44 has already stored the RCD:

An assumption is also made that the program in the 1st ROM 41 includes a process for transferring the RCD corresponding to the 1st ROM 41 in the memory 44 to the 1st RAM 42, and the RCD corresponding to the 2nd ROM 411 to the 2nd CPU 413 via the 1st CPU 43, when the 1st CPU 43 is reset. Likewise, the program in the 2nd ROM 411 is assumed to include a process for transferring the RCD delivered from the 1st CPU 43 to the 2nd RAM 412.

Let it be supposed once again that new problems are found in the program stored in the 1st ROM 41 and the program stored in the 2nd ROM 411 of the electronic equipment, in the above condition.

In the same way as the third exemplary embodiment, individual RCDs for correcting the problems are prepared, and the RCDs are stored in the memory 46 external of the electronic equipment. The memory 46 storing the RCDs is then connected to the connector 130 of the electronic equipment. The transfer unit 45 connected to the connector 130 detects the connection, and send the fact to the 1st CPU 43. Also , the transfer unit 45 reads and delivers a version of each of the correction programs stored in the memory 46 to the comparator unit 47. The comparator unit 47 compares the versions of the individual correction programs of the memory 46 received from the transfer unit 45 with the versions of the individual correction programs stored at that point of time in the memory 44, and delivers a result as well as the versions of the individual correction programs to the 1st CPU 43. Upon receipt of the information, the 1st CPU 43 orders the display unit 48 to show the versions of the individual correction programs in the memory 44 and the versions of the individual correction programs in the memory 46. The display unit 48 shows them according to the command of the 1st CPU 43. By referring to the display, a user verified the versions of the existing correction programs, and inputs a command for the 1st CPU 43 to update versions of the correction programs by manipulating the operation unit 49, if he determines it necessary. The 1st CPU 43 may accept the command received from the operation unit 49 only if the versions of the individual correction programs in the memory 46 are later than those of the memory 44, as a matter of course, and orders the transfer unit 45 to transfer the individual RCDs in the memory 46 to the memory 44. Thus, the transfer unit 45 transfers the individual RCDs in the memory 46 to the memory 44 pursuant to the order. Connection of the memory 46 to the electronic equipment is then disconnected when the individual RCDs are transferred to the memory 44. Following the above, the 1st CPU 43 is reset by unplugging and plugging the AC supply plug, or by turning off and on the power supply to the electronic equipment. The 1st CPU 43 transfers the RCD corresponding to the program stored in the 1st ROM 41 to the 1st RAM 42, and the other RCD corresponding to the program stored in the 2nd ROM 411 to the 2nd CPU 413, by this resetting operation. The 2nd CPU 413 also stores the RCD delivered from the 1st CPU 43 into the 2nd RAM 412. Subsequently, the 1st CPU 43 executes the program in the 1st ROM 41 and the correction program in the 1st RAM 42, when it comes to the correcting point stored in the 1st RAM 42. The problem of the program stored in the 1st ROM 41 can be corrected in this way.

Similarly, the 2nd CPU 413 is able to make correction of the problem in the program stored in the 2nd ROM 411 by executing the program in the 2nd ROM 411 and the correction program in the 2nd RAM 412, when it comes to the correcting point stored in the 2nd RAM 412.

As has been described, the fourth exemplary embodiment is able to exchange the RCDs among a plurality of the CPUs by utilizing only one transfer unit and one internal memory connected to one of the CPUs, in addition to having the advantages stated in the third exemplary embodiment. The result is a noble effect capable of making correction of programs stored in a plurality of the ROMs that are not even connected to the internal memory.

What is claimed is:

1. A method of correcting a program in a ROM unit provided in electronic equipment, comprising the steps of:

(1) connecting to the electronic equipment an external memory storing ROM correction data including a correction program for said ROM unit, a correcting point, and a version number of the correction program;

(2) verifying the connection of said external memory, and storage of the ROM correction data therein by a data transfer unit in said electronic equipment, and communicating a connection state to a CPU unit in said electronic equipment;

(3) comparing the version number of the correction program stored in said external memory with a version number of a correction program read from an internal memory and communicating the result thereof to said CPU unit;

(4) displaying, in response to a command from said CPU unit, the version number of the correction program stored in said external memory and the version number of the correction program stored in said internal memory;

(5) detecting a manual input command confirming the version number of the correction program stored in said external memory, and communicating the manual input command to said CPU unit;

(6) said CPU, based on said manual input command, ordering said data transfer unit to transfer the ROM correction data in said external memory to an internal memory;

(7) transferring said ROM correction data stored in said internal memory to a RAM unit within said electronic equipment by said CPU unit; and (8) executing the correction program in said RAM unit upon reaching the correcting point stored in said RAM unit.

2. The method of claim 1, further comprising the step of:

(9) resetting said CPU unit after completion of transferring said ROM correction data in said external memory to said internal memory.

3. Electronic equipment comprising:

(1) a ROM unit for storing a program;

(2) a RAM unit for storing ROM correction data including a correction program for correcting said program in said ROM unit, a correcting point defining location information identifying a point from which to initiate execution of said correction program, and a version number of said correction program;

(3) a CPU unit for executing said correction program in said RAM unit when an executing position of the program stored in said ROM unit reaches said correcting point stored in said RAM unit, (4) an internal nonvolatile memory for storing said ROM correction data, and transferring said ROM correction data to said RAM unit at a command of said CPU unit;

(5) a data transfer unit capable of being connected with a detachable external nonvolatile memory storing said ROM correction data from outside of said electronic equipment, wherein said data transfer unit, upon detecting being connected with the external nonvolatile memory, transfers said ROM correction data to said internal nonvolatile memory only if the external nonvolatile memory stores said data;

(6) a comparator unit for comparing a version number of said correction program read from said external nonvolatile memory through said data transfer unit and a version number of said correction program read from said internal nonvolatile memory, and delivering a result thereof to said CPU unit;

(7) a display unit for showing the version number of the correction program stored in said external nonvolatile memory and the version number of the correction program stored in said internal nonvolatile memory pursuant to a command of said CPU unit; and (8) an operation unit for inputting a command for said CPU unit to transfer the ROM connection data stored in said external nonvolatile memory to said internal nonvolatile memory.

4. The electronic equipment according to claim 3, further comprising a plurality of combinations composed of the CPU units, the ROM units and the RAM units, and communication means whereby said units are able to exchange the ROM correction data with one another.

* * * * *

UNITED STATES PATENT AND TRADEMARK OFFICE
CERTIFICATE OF CORRECTION

PATENT NO. : 6,532,587 B1
DATED : March 11, 2003
INVENTOR(S) : Ryuichi Sakai et al.

It is certified that error appears in the above-identified patent and that said Letters Patent is hereby corrected as shown below:

Title page,
Item [54], Title , should read -- A METHOD AND SYSTEM FOR CORRECTING A PROGRAM IN ROM --.

Column 10,
Line 1, "said CPU," should read -- said CPU unit, --
Line 3, "an internal' should read -- said internal --
Line 38, "for comparing a version" should read -- for comparing said version --.

Signed and Sealed this

Twenty-fourth Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,532,587 B1
DATED : March 11, 2003
INVENTOR(S) : Ryuichi Sakai et al.

It is certified that error appears in the above-identified patent and that said Letters Patent is hereby corrected as shown below:

Column 10,
Line 5, "correction data stored" should read -- correction data, including the correction program and the correcting point, stored --.
Line 8, "RAM unit upon" should read -- RAM unit based upon the ROM correction data transferred into said RAM unit upon --.
Line 29, "at a command" should read -- at a first command --.
Line 37, "stores said data." should read -- stores said ROM correciton data; --
Line 48, "pursuant to a command" should read -- pursuant to a second command --.
Line 50, "data stored" should read -- data, including i) the correction program for correcting said program in said ROM unit, ii) the correcting point, and iii) said version number of said correction program stored --.

Signed and Sealed this

Eighteenth Day of January, 2005

JON W. DUDAS
*Director of the United States Patent and Trademark Office*